A. F. BECKER.
CANDY PACKAGE.
APPLICATION FILED SEPT. 28, 1910.

982,461.

Patented Jan. 24, 1911.

Witnesses
Jos. A. Ryan
M. C. Mattingly

Inventor
Amalie F. Becker

By Greeley & McIntire
Attorneys

UNITED STATES PATENT OFFICE.

AMALIE F. BECKER, OF PHILADELPHIA, PENNSYLVANIA.

CANDY-PACKAGE.

982,461.  Specification of Letters Patent.  Patented Jan. 24, 1911.

Application filed September 28, 1910. Serial No. 584,270.

*To all whom it may concern:*

Be it known that I, AMALIE F. BECKER, a citizen of the United States, residing at 224 North Fifth street, Philadelphia, in the county of Philadelphia and State of Pennsylvania, have invented certain new and useful Improvements in Candy-Packages; and I do hereby declare the following to be a full, clear, and exact description of the invention, such as will enable others skilled in the art to which it appertains to make and use the same.

This invention relates to new and useful improvements in candy packages, and has for an object to provide a novel means of putting up candy, to both preserve the contents thereof and present a pleasing appearance.

Another object of this invention is to produce a candy package comprising a number of globular shaped candy containing members, each having a supplementary stem adapted to be secured to a main stem, provided with suitable ornamentation to present with the said candy containing members the appearance of a bunch of grapes.

A further object of this invention is to improve and simplify devices of this character, rendering them comparatively simple and inexpensive to manufacture, reliable and efficient in use, and readily assembled.

In effecting these above mentioned objects, this invention resides in the novel features of construction, formations, combinations and arrangements of parts to be hereinafter more fully described, claimed and illustrated in the accompanying drawing, in which—

Figure 1:
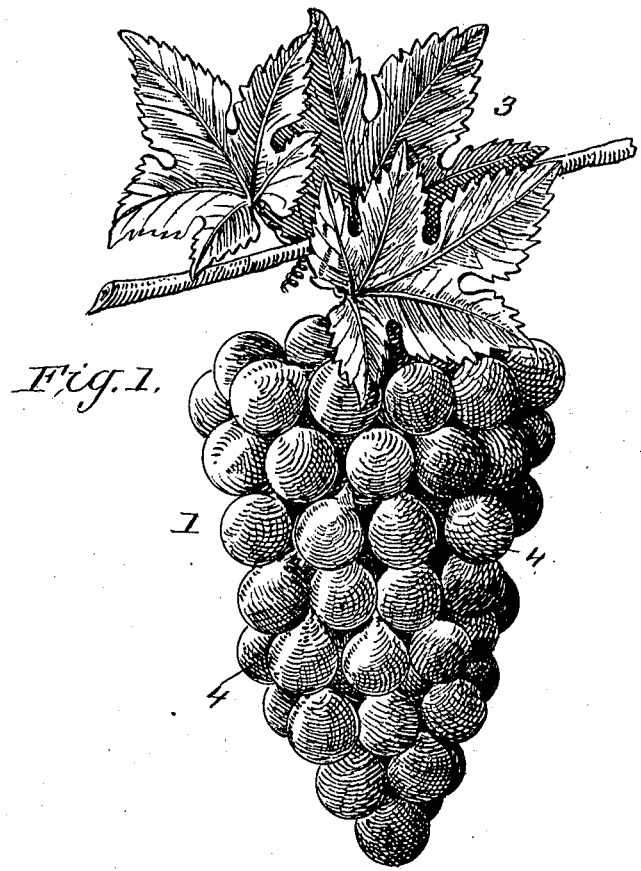
Figure 2:
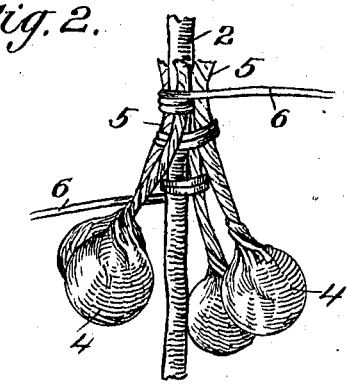

Figure 1 is a side elevation of my improved candy package, and Fig. 2 is a detail view illustrating the manner in which the candy containing members are secured to the main stem.

Referring to the drawing by characters of reference, the numeral 1 designates generally my improved candy package, comprising a main stem 2, upon the upper end of which is provided any suitable ornamentation 3, which in the present instance is illustrated as in the form of a bunch of grape leaves. Candy containing members 4, formed by twisting paraffin paper, or other suitable material, around globular shaped pieces of candy, so as to provide twisted stem forming extensions 5, which are secured at intervals to the main stem 2 by means of a flexible winding 6, formed preferably from bark fiber, dried grass or the like.

From the foregoing disclosure it will be manifest that a candy package is provided for which will both preserve the contents thereof and present the pleasing appearance of a bunch of grapes, it being understood, however, that the design need not be limited to the said bunch of grapes, but may include several bunches, or, in fact, any other kind of fruit.

Having thus fully described this invention, what I claim as new and desire to secure by Letters Patent is:

In a candy package the combination with a main stem, of a series of candy-containing members formed by twisting pieces of paraffin paper or the like around globular-shaped pieces of candy in such manner as to provide stem-forming extensions, a winding extending the full length of the main stem and securing the stem-forming extensions thereto in such positions upon the main stem that the candy-containing members will be held in staggered relation to each other for the purpose of concealing the winding, and an ornamentation provided upon the stem to form with the candy-containing members the appearance of a bunch of grapes.

In testimony whereof I affix my signature in presence of two witnesses.

AMALIE F. BECKER.

Witnesses:
GEORGE DUNTON,
ANDREW J. PEIFER.